(12) United States Patent
Granshaw et al.

(10) Patent No.: US 9,264,310 B2
(45) Date of Patent: Feb. 16, 2016

(54) MONITORING AND DISTRIBUTING EVENT PROCESSING WITHIN A COMPLEX EVENT PROCESSING ENVIRONMENT

(71) Applicant: International Business Machines Corporation, Armonk, NY (US)

(72) Inventors: David Granshaw, Eastleigh (GB); Samuel T. Massey, Winchester (GB); Daniel J. McGinnes, Southampton (GB); Martin A. Ross, Winchester (GB); Richard G. Schofield, Eastleigh (GB); Craig H. Stirling, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 278 days.

(21) Appl. No.: 13/861,415

(22) Filed: Apr. 12, 2013

(65) Prior Publication Data
US 2014/0310331 A1    Oct. 16, 2014

(51) Int. Cl.
*G06F 15/173* (2006.01)
*H04L 12/24* (2006.01)
*H04L 12/26* (2006.01)
(Continued)

(52) U.S. Cl.
CPC ........ *H04L 41/0893* (2013.01); *H04L 43/0817* (2013.01); *H04L 43/16* (2013.01); *H04L 67/322* (2013.01); *G06F 9/5083* (2013.01); *G06F 17/30516* (2013.01)

(58) Field of Classification Search
CPC .......................... G06F 17/30516; G06F 9/5083
USPC .......................................... 709/223, 224, 226
See application file for complete search history.

(56) References Cited

U.S. PATENT DOCUMENTS 7,856,634 B2 * 12/2010 Satou et al. ............... 718/105
2010/0070981 A1   3/2010 Hadar et al.
(Continued)

FOREIGN PATENT DOCUMENTS

EP        2487868 A1 *  8/2012

OTHER PUBLICATIONS

"Distributed Complex Event Processing". Play Project play_fp7. Partner: FZI. More information: roland.stuehnner [at] fzi.de.
"Fujitsu Develops Distributed and Parallel Complex Event Processing Technology that Rapidly Adjusts Big Data Load Fluctuations". Dec. 16, 2011. Tokyo and Kawasaki. Copyright 1995-2012 Fujitsu. [Retrieved on: Oct. 30, 2012]. Retrieved from the internet: <www.fujitsu.com/global/news/pr/archives/month/2011/20111216-02.html>.

(Continued)

*Primary Examiner* — Wing F Chan
*Assistant Examiner* — Joseph Maniwang
(74) *Attorney, Agent, or Firm* — Daniel R. Simek; Maeve L. McCarthy

(57) ABSTRACT

A method for event processing within a complex event processing environment. The method includes monitoring a plurality of event processing paths of the complex event processing environment. The method includes determining that utilization of server resources in the complex event processing environment has exceeded a threshold value and identifying one or more event processing paths responsible for the high utilization of server resources. The method includes determining that the one or more event processing paths contain an independent rule, wherein an independent rule includes a rule or a rule subset where data for processing of the rule or rule subset is accessible by a client computing device. The method then includes determining the client computing device can perform processing of the independent rule and transferring processing of the independent rule to the client computing device.

18 Claims, 3 Drawing Sheets

(51) Int. Cl.
*H04L 29/08* (2006.01)
*G06F 17/30* (2006.01)
*G06F 9/50* (2006.01)

(56) References Cited

U.S. PATENT DOCUMENTS

2011/0252433 A1* 10/2011 Isoyama ................ 719/318
2011/0314079 A1   12/2011 Karande et al.
2012/0084788 A1*  4/2012 Sakamoto ................ 718/105

OTHER PUBLICATIONS

Isoyama, K. et al. "Short Paper: A Scalable Complex Event Processing System and Evaluations of its Performance". DEBS '12, Jul. 16-20, 2012. Berlin, Germany. ACM 978-1-4503-1315-5. pp. 123-126.

* cited by examiner

MONITORING AND DISTRIBUTING EVENT PROCESSING WITHIN A COMPLEX EVENT PROCESSING ENVIRONMENT

FIELD OF THE INVENTION

The present invention relates generally to the field of complex event processing, and more particularly to monitoring and distributing event processing within a complex event processing environment.

BACKGROUND OF THE INVENTION

Event processing is a computer-based method of tracking and analyzing streams of data and information about things happening in the real world, known as "events", and deriving a conclusion from the events. An event can occur in a business context, such as a financial transaction or a sales figure, in an industrial process, such as a temperature rising above a threshold, or an event can be some occurrence in a computer. Complex event processing is event processing that combines data from multiple data sources to infer events or patterns suggesting more complicated circumstances.

Event processing services process events based on a set of rules, which typically include a condition rule statement and an action rule statement. Patterns are detected based on the condition rule statement and an output is generated and transmitted based on the action rule statement. For example, a simple condition rule statement might look for a specific value appearing in information from a data source and a simple action rule statement might generate a report that the value was found. In complex event processing, the condition rule statements and action rule statements are reported by multiple clients and each client generates data and information related to the rule statements, all of which must be processed and analyzed to identify patterns and perform actions.

SUMMARY

Embodiments of the present invention disclose a method, computer program product, and computer system for event processing within a complex event processing environment. The method includes monitoring a plurality of event processing paths of the complex event processing environment. The method includes determining that utilization of server resources in the complex event processing environment has exceeded a threshold value and identifying one or more event processing paths of the plurality of event processing paths responsible for the high utilization of server resources. The method includes determining that the one or more event processing paths contain an independent rule, wherein an independent rule includes a rule or a rule subset where data for processing of the rule or rule subset is accessible by a client computing device. The method includes determining the client computing device can perform processing of the independent rule and transferring processing of the independent rule to the client computing device.

DETAILED DESCRIPTION

Figure 1:
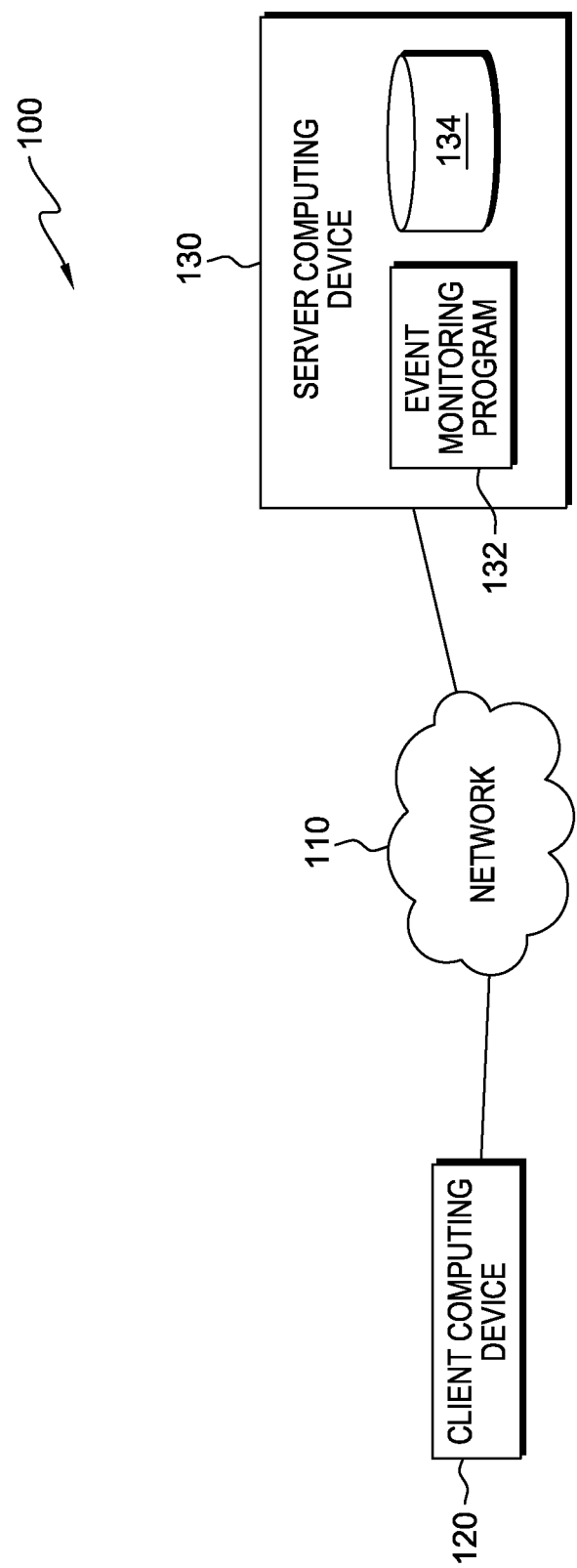
FIG. 1 is a functional block diagram illustrating a complex event processing environment, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating a complex event processing environment, generally designated 100, in accordance with one embodiment of the present invention.

Complex event processing environment 100 includes client computing device 120 and server computing device 130, all interconnected via network 110. Network 110 can be, for example, a local area network (LAN), a wide area network (WAN) such as the Internet, or a combination of the two, and can include wired, wireless, or fiber optic connections. In general, network 110 can be any combination of connections and protocols that will support communications between client computing device 120 and server computing device 130.

In various embodiments of the present invention, client computing device 120 can be a laptop computer, a tablet computer, a netbook computer, a personal computer (PC), a desktop computer, a personal digital assistant (PDA), a smart phone, or any programmable electronic device capable of communicating with server computing device 130 via network 110. While only one client computing device is shown in FIG. 1, one of skill in the art will appreciate that within complex event processing environment 100 there are typically multiple client computing devices, all communicating with server computing device 130 via network 110.

Server computing device 130 includes event monitoring program 132 and database 134. Server computing device 130 can be a laptop computer, a tablet computer, a netbook computer, a PC, a desktop computer, a PDA, a smart phone, or any programmable electronic device capable of performing complex event processing and of communicating with client computing device 120 via network 110. In various embodiments of the present invention, server computing device 130 represents a computing system utilizing clustered computers and components to act as a single pool of seamless resources when accessed through a network, such as network 110. This is a common implementation for data centers and for cloud computing applications. Server computing device 130 may include internal and external components as depicted and described in further detail with respect to FIG. 3.

Event monitoring program 132 monitors processing within complex event processing environment 100 and determines which event processing paths are using the most resources available to server computing device 130. Event monitoring program 132 analyzes the determined event processing paths to identify the clients sending the events creating these processing paths. Event monitoring program 132 determines whether the rule being processed through the event processing path is an independent rule, or contains an independent rule subset, with all data required for the rule or rule subset provided by or accessible to the client. If the client rule, or rule subset, is independent, event monitoring program 132 requests the client, for example, client computing device 120, handle the processing of the rule, rather than the server, for example, server computing device 130. If the client agrees to handle processing of the rule, event monitoring program 132 transfers the rule processing workload to the client. Database 134 stores shared data and information, including contextual data, temporal data and rule statements, for each client within complex event processing environment 100. While in FIG. 1, database 134 is shown within server computing device 130, one of skill in the art will appreciate that database 134 may be located external to server computing device 130 and accessible through network 110.

Figure 2:
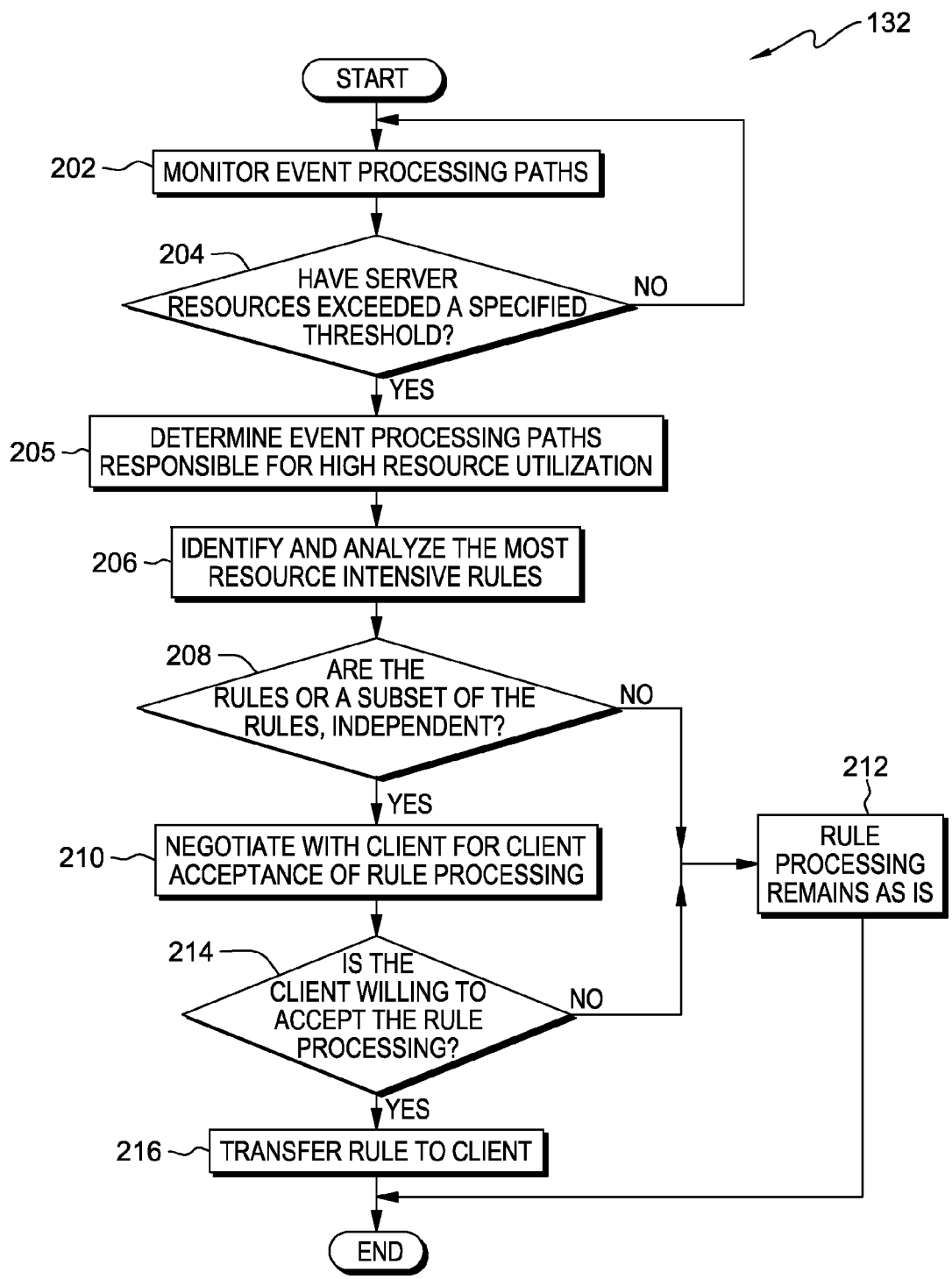
FIG. 2 is a flowchart depicting operational steps of an event monitoring program for monitoring, analyzing and distributing event processing within the complex event processing environment of FIG. 1, in accordance with an embodiment of the present invention.

FIG. 2 is a flowchart depicting operational steps of event monitoring program 132 for monitoring, analyzing and distributing event processing within complex event processing environment 100, in accordance with an embodiment of the present invention.

Event monitoring program 132 monitors event processing paths within server computing device 130 (step 202). The type of processing carried out by the server depends on an event type received and contextual and temporal data provided by a client. An event can include a situation where, for example, a client may be interested in receiving a notification when spending by any family member exceeds a specified threshold limit in a seven day period. The client, for example, client computing device 120, can send reports containing information about every purchase to, for example, server computing device 130 in complex event processing environment 100. The server creates an internal representation of the report details and stores information about all purchases in a database, for example, database 134. Additionally, for each event received, the server runs any rules and performs any actions applicable to that event type, for example, sending a report to the customer if the total of all spending by the current family member in the most recent seven day period has exceeded the specified threshold. An event processing path includes the initial event data, the processing of the event by the server, and the generation of any actions for the event. Multiple clients can send multiple events, each with their own event processing path. Event monitoring program 132 monitors the event processing paths to determine a variety of factors, including a number of executions of the processing path, which may be an indication of how often the path is used, and resource utilization, which may be an indication of how much information, including the complexity of the rule processing or the quantity of data, is being transmitted between the client and server.

Event monitoring program 132 determines whether server resources have exceeded a specified threshold (decision block 204). The specified threshold for resource utilization, for example, CPU utilization, may be set by an owner or operator of server computing device 130. If server resources have exceeded the specified threshold (decision block 204, yes branch), event monitoring program 132 determines which event processing paths, or rule execution paths, are responsible for the high resource utilization (step 205). High resource utilization, or a high workload, is indicated by a high number of executions, a high resource utilization or high traffic between a client device and a server device, for example, when a client continuously stores and accesses information in database 134 for use with a rule statement. The determination of which event processing paths are responsible for the high resource utilization can be made relative to other processing paths. If server resources have not exceeded a specified threshold (decision block 204, no branch), for instance, there are no heavily loaded rule execution paths, event monitoring program 132 continues to monitor the event processing paths (step 202).

Event monitoring program 132 identifies and analyzes the most resource intensive rules (step 206). Event monitoring program 132 identifies the rules creating the heavily loaded event processing paths and analyzes the event rules to determine the type and complexity of processing and where the data is located that the rule uses, in particular, whether a client has access to, for example, the analytical functions, data, web service, file system or database that may be required during processing.

Event monitoring program determines whether the rules, or a subset of the rules, are independent (decision block 208). An independent rule is a rule, or a subset of a rule, that requires only data available to, which may include accessible by or supplied by, the client in order to be evaluated, and therefore all of the fields are accessible by the client. If a rule or a rule subset is not independent (decision block 208, no branch), event monitoring program 132 keeps the rule processing as is currently performed by the server (step 212). In various embodiments of the present invention, the server may re-write a rule to allow subsets of the rule processing to be undertaken by the client.

If a rule, or a subset of a rule, is independent (decision block 208, yes branch), event monitoring program 132 negotiates with the client that sent the events that triggered the rule processing for client acceptance of the rule processing (step 210). The negotiation determines whether the client is capable of performing the rule processing. For example, the client may have preset conditions specifying it will only accept rule processing between the hours of 6 PM and 8 AM when the resource utilization of the client is less than 50%. In negotiating with the client, event monitoring program 132 may ask the client for additional information to determine its capabilities and whether it has access to all of the resources required; this may be as simple as determining the client software version and the location of the client computing device.

Event monitoring program 132 determines if the client is willing to accept the processing of the rule (decision block 214). At any time, and for any event processing rule, the client may refuse to take over processing, for example, due to resource constraints or capabilities. If the client is not willing to accept the rule processing (decision block 214, no branch), event monitoring program keeps the rule processing as is currently performed by the server (step 212). Any workload not transferred to the client continues to be processed by the server. Some rules cannot be transferred to a client, for example, rules requiring information that the client is not able to access, such as restricted data within database 134, or requiring more advanced processing capabilities.

If the client is willing to accept responsibility for the processing of the rule (decision block 214, yes branch), the rule processing is transferred to the client (step 216). For example, for a rule monitoring family spending within one account, such as notifying the customer account owner when any one family member spends more than $1,000 on more than three occasions within a month, the client accesses transaction activity on the account. When three transactions, each totaling over $1,000 are observed, the client sends an email to the customer. The client can choose to stop processing at any time, for example, due to resource constraints, and the server will resume processing. The server may also get the responsibilities for processing back from the client at any time, such as if an updated rule is published that invalidates the current rule.

Figure 3:
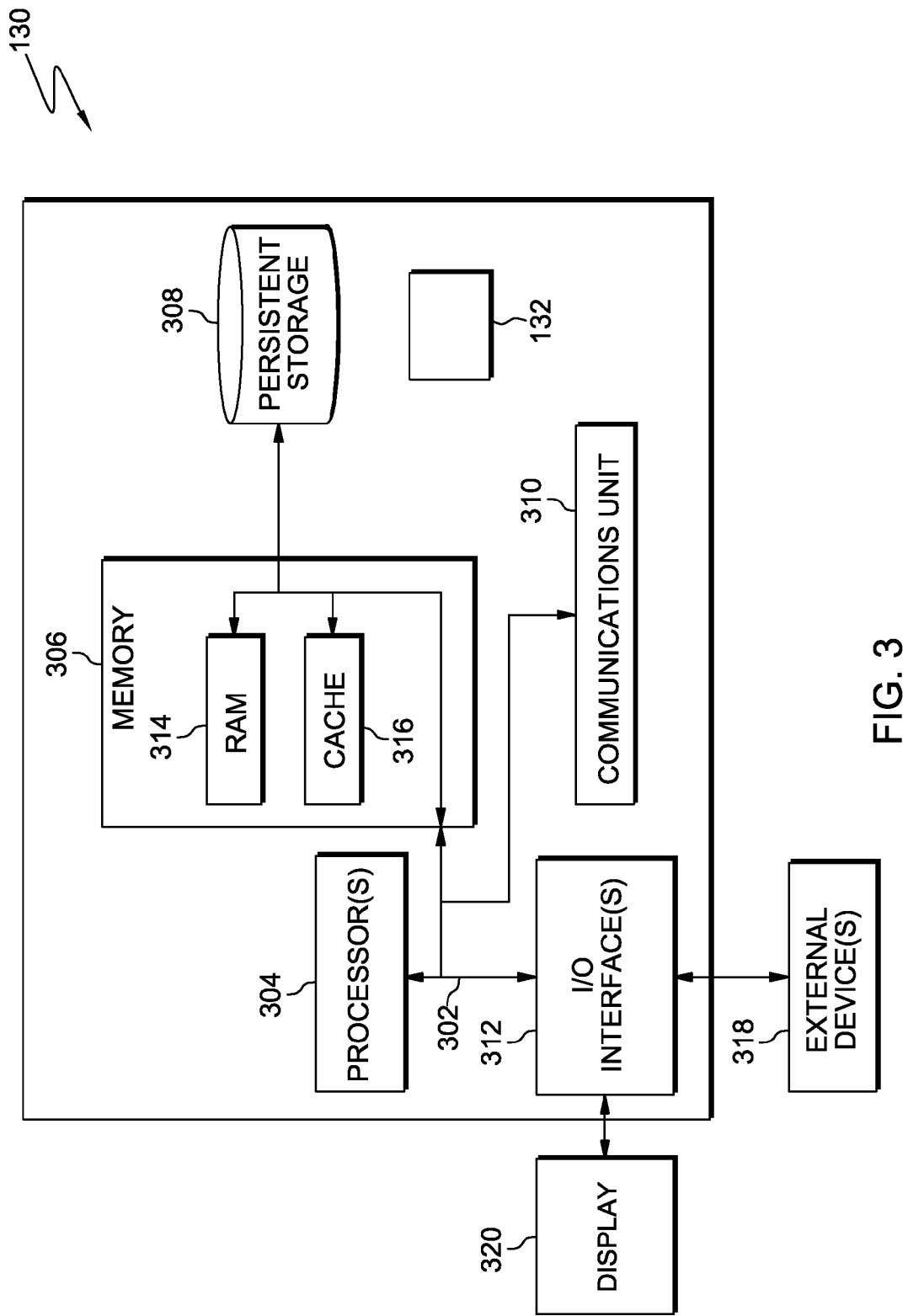
FIG. 3 depicts a block diagram of components of a data processing system, such as the server computing device of FIG. 1, in accordance with an embodiment of the present invention.

FIG. 3 depicts a block diagram of components of server computing device 130, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server computing device 130 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

Event monitoring program 132 and database 134 are stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including client computing device 120. In these examples, communications unit 310 includes one or more network interface cards. Communications unit 310 may provide communications through the use of either or both physical and wireless communications links. Event monitoring program 132 and database 134 may be downloaded to persistent storage 308 through communications unit 310.

I/O interface(s) 312 allows for input and output of data with other devices that may be connected to server computing device 130. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., event monitoring program 132 and database 134, can be stored on such portable computer-readable storage media and can be loaded onto persistent storage 308 via I/O interface(s) 312. I/O interface(s) 312 also connect to a display 320. Display 320 provides a mechanism to display data to a user and may be, for example, a computer monitor or an incorporated display screen, such as is used in tablet computers and smart phones.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for event processing within a complex event processing environment, the method comprising:
   monitoring a plurality of event processing paths, wherein an event processing path is a path of communication between a client computing device and a server computing device within a complex event processing environment;
   determining, by one or more computer processors, that utilization of server resources in the complex event processing environment has exceeded a threshold value;
   identifying an event processing path of the plurality of event processing paths and a corresponding client computing device that is responsible for the high utilization of server resources;
   determining, by the one or more computer processors, that the identified event processing path contains an independent rule, wherein the independent rule includes a rule or a rule subset where all data required for processing the independent rule on the identified event processing path is supplied by the identified corresponding client computing device that is responsible for the high utilization of server resources;
   determining, by the one or more computer processors, the identified corresponding client computing device can perform processing of the independent rule; and
   transferring processing of the independent rule to the identified corresponding client computing device.

2. The method of claim 1, wherein the threshold value for utilization of server resources is set by an owner or operator of the server computing device.

3. The method of claim 1, wherein the communication includes one or more of: contextual data, temporal data, rule statements, available resources and resource requirements.

4. The method of claim 3, wherein the client computing device includes multiple computing devices connected to the complex event processing environment through one or more of: a local area network, a wide area network or a combination of a local area network and a wide area network.

5. The method of claim 1, further comprising:
   determining, by the one or more computer processors, that the identified event processing path contains rules where data required for processing the rules on the identified event processing path is not supplied by the identified corresponding client computing device;
   splitting the rules into rule subsets, wherein at least one of the rule subsets is an independent rule; and
   transferring processing of the rule subset that includes an independent rule to the identified corresponding client computing device.

6. The method of claim 1, wherein the determination that the identified corresponding client computing device can perform processing further comprises determining, by the one or more computer processors, the identified corresponding client computing device has resources capable of processing the independent rule and is willing to accept processing of the rule.

7. The method of claim 1, wherein a rule for rule processing includes a data to be analyzed and an action to be taken based on the analyzed data.

8. A computer program product for event processing within a complex event processing environment, the computer program product comprising:
   one or more computer-readable tangible storage devices and program instructions stored on the one or more computer-readable tangible storage devices, the program instructions comprising:
   program instructions to monitor a plurality of event processing paths, wherein an event processing path is a path of communication between a client computing device and a server computing device within a complex event processing environment;
   program instructions to determine that utilization of server resources in the complex event processing environment has exceeded a threshold value;
   program instructions to identify an event processing path of the plurality of event processing paths and a corresponding client computing device that is responsible for the high utilization of server resources;
   program instructions to determine that the identified event processing path contains an independent rule, wherein the independent rule includes a rule or a rule subset where all data required for processing the independent rule on the identified event processing path is supplied by the identified corresponding client computing device that is responsible for the high utilization of server resources;

program instructions to determine the identified corresponding client computing device can perform processing of the independent rule; and program instructions to transfer processing of the independent rule to the identified corresponding client computing device.

9. The computer program product of claim 8, wherein the threshold value for utilization of server resources is set by an owner or operator of the server computing device.

10. The computer program product of claim 8, wherein the communication includes one or more of: contextual data, temporal data, rule statements, available resources and resource requirements.

11. The computer program product of claim 8, further comprising:

program instructions to determine that the identified event processing path contains rules where data required for processing the rules on the identified event processing path is not supplied by the identified corresponding client computing device;

program instructions to split the rules into rule subsets, wherein at least one of the rule subsets is an independent rule; and program instructions to transfer processing of the rule subset that includes an independent rule to the identified corresponding client computing device.

12. The computer program product of claim 8, wherein the program instructions to determine that the identified corresponding client computing device can perform processing further comprise program instructions to determine the identified corresponding client computing device has resources capable of processing the independent rule and is willing to accept processing of the rule.

13. A computer system for event processing within a complex event processing environment, the computer system comprising:

one or more computer processors;

one or more computer-readable tangible storage media;

program instructions stored on the one or more computer-readable tangible storage media for execution by at least one of the one or more computer processors, the program instructions comprising:

program instructions to monitor a plurality of event processing paths, wherein an event processing path is a path of communication between a client computing device and a server computing device within a complex event processing environment;

program instructions to determine that utilization of server resources in the complex event processing environment has exceeded a threshold value;

program instructions to identify an event processing path of the plurality of event processing paths and a corresponding client computing device that is responsible for the high utilization of server resources;

program instructions to determine that the identified event processing path contains an independent rule, wherein the independent rule includes a rule or a rule subset where all data required for processing the independent rule on the identified event processing path is supplied by the identified corresponding client computing device that is responsible for the high utilization of server resources;

program instructions to determine the identified corresponding client computing device can perform processing of the independent rule; and program instructions to transfer processing of the independent rule to the identified corresponding client computing device.

14. The computer system of claim 13, wherein the threshold value for utilization of server resources is set by an owner or operator of the server computing device.

15. The computer system of claim 13, wherein the communication includes one or more of: contextual data, temporal data, rule statements, available resources and resource requirements.

16. The computer system of claim 15, wherein the client computing device includes multiple computing devices connected to the complex event processing environment through one or more of: a local area network, a wide area network or a combination of a local area network and a wide area network.

17. The computer system of claim 13, further comprising:

program instructions to determine that the identified event processing path contains rules where data required for processing the rules on the identified event processing path is not supplied by the identified corresponding client computing device;

program instructions to split the rules into rule subsets, wherein at least one of the rule subsets is an independent rule; and program instructions to transfer processing of the rule subset that includes an independent rule to the identified corresponding client computing device.

18. The computer system of claim 13, wherein the program instructions to determine that the identified corresponding client computing device can perform processing further comprise program instructions to determine the identified corresponding client computing device has resources capable of processing the independent rule and is willing to accept processing of the rule.

* * * * *